United States Patent [19]
Latta et al.

[11] Patent Number: 5,253,236
[45] Date of Patent: Oct. 12, 1993

[54] OPTICAL BEAM FOCUSING AND TRACKING SYSTEM FOR AN OPTICAL DISK INFORMATION STORAGE DEVICE

[75] Inventors: Milton R. Latta; Timothy C. Strand; James M. Zavislan, all of San Jose, Calif.

[73] Assignee: International Business Machines Corporation, Armonk, N.Y.

[21] Appl. No.: 770,560

[22] Filed: Oct. 3, 1991

[51] Int. Cl.$^5$ ............................................. G11B 21/00
[52] U.S. Cl. ..................... 369/44.24; 368/112; 250/201.5
[58] Field of Search .............. 369/44.11, 44.23, 44.24, 369/114, 117, 118, 44.41, 44.42, 109, 110, 103, 120, 112; 250/201.5

[56] References Cited

U.S. PATENT DOCUMENTS

| | | | |
|---|---|---|---|
| 4,450,547 | 5/1984 | Nakamura et al. | 369/45 |
| 4,636,628 | 1/1987 | Tsukai | 369/44.24 |
| 4,672,188 | 6/1987 | Cohen | 250/201 |
| 4,705,940 | 11/1987 | Kohno | 250/201 |
| 4,816,665 | 3/1989 | Hsu | 250/201 |
| 4,817,074 | 3/1989 | Yamanaka | 369/44.24 |
| 4,913,524 | 4/1990 | Kreuzer | 350/162.12 |
| 5,036,185 | 7/1991 | Ando | 369/44.24 |
| 5,113,386 | 5/1992 | Whitehead et al. | 369/44.24 |
| 5,126,563 | 6/1992 | Aikoh et al. | 369/44.23 |

FOREIGN PATENT DOCUMENTS

| | | | |
|---|---|---|---|
| 961682 | 1/1975 | Canada | 88/118 |
| 0376708 | 7/1990 | European Pat. Off. | |
| 62-146439 | 6/1987 | Japan . | |
| 63-74132 | 4/1988 | Japan | 369/44.23 |
| 63-157326 | 6/1988 | Japan . | |
| 1-89043 | 4/1989 | Japan . | |

OTHER PUBLICATIONS

Y. Kimura et al., High Performance Optical Head Using Optimized Holographic Optical Element, *Jpn. J. Appl. Phys*, (1987) Supp. 26-4.

*Primary Examiner*—Aristotelis Psitos
*Assistant Examiner*—N. Hindi
*Attorney, Agent, or Firm*—Baker, Maxham, Jester & Meador

[57] ABSTRACT

A mask is used to remove substantially all of the first order diffraction components of a reflected light beam which are generated as the beam crosses grooved data tracks in an optical media. The mask may comprise a transparent substrate with an opaque layer having a pair of circular apertures or a bow-tie shaped aperture. The apertures are located outside the regions of interference between the diffracted components and the undiffracted component. The layer may be made of a reflective material for reflecting diffracted components of the reflected beam to a tracking error sensor. The layer may be made of a holographic material for deflecting the diffracted components to a tracking error sensor.

14 Claims, 8 Drawing Sheets

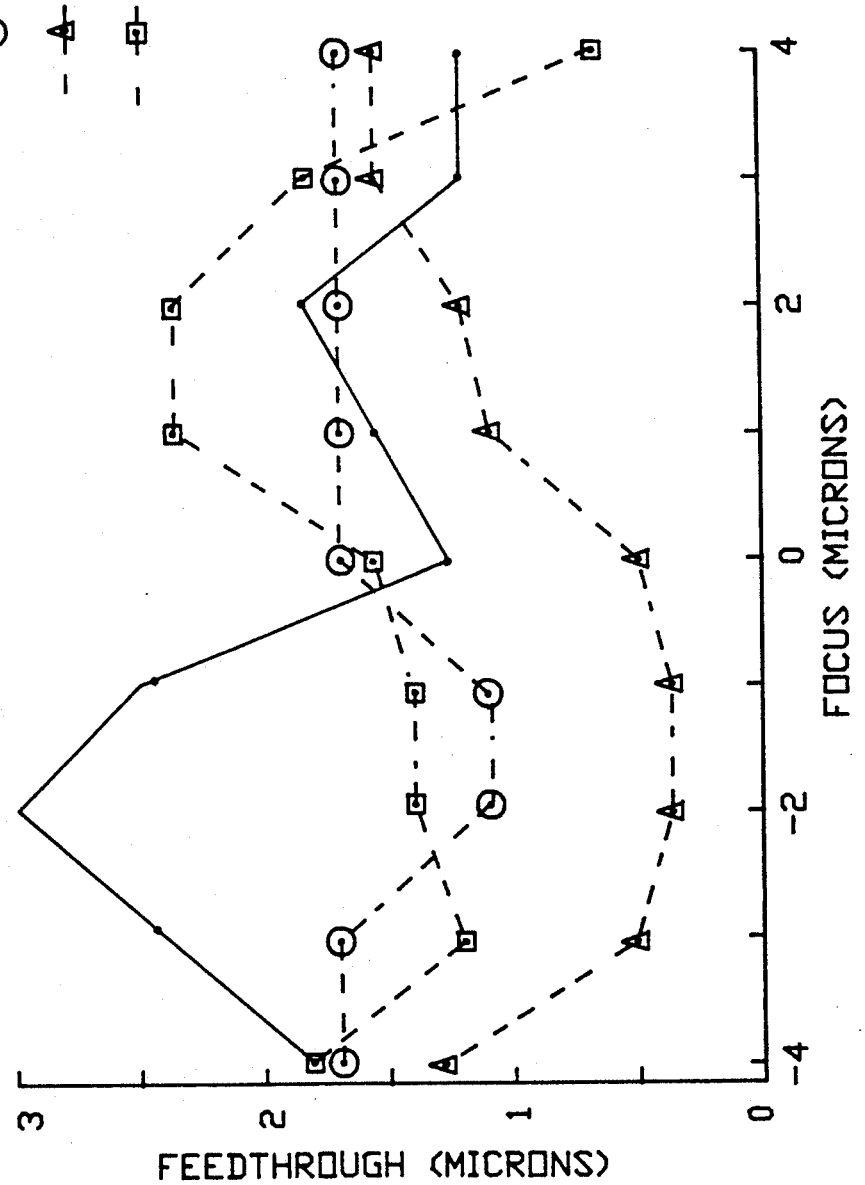

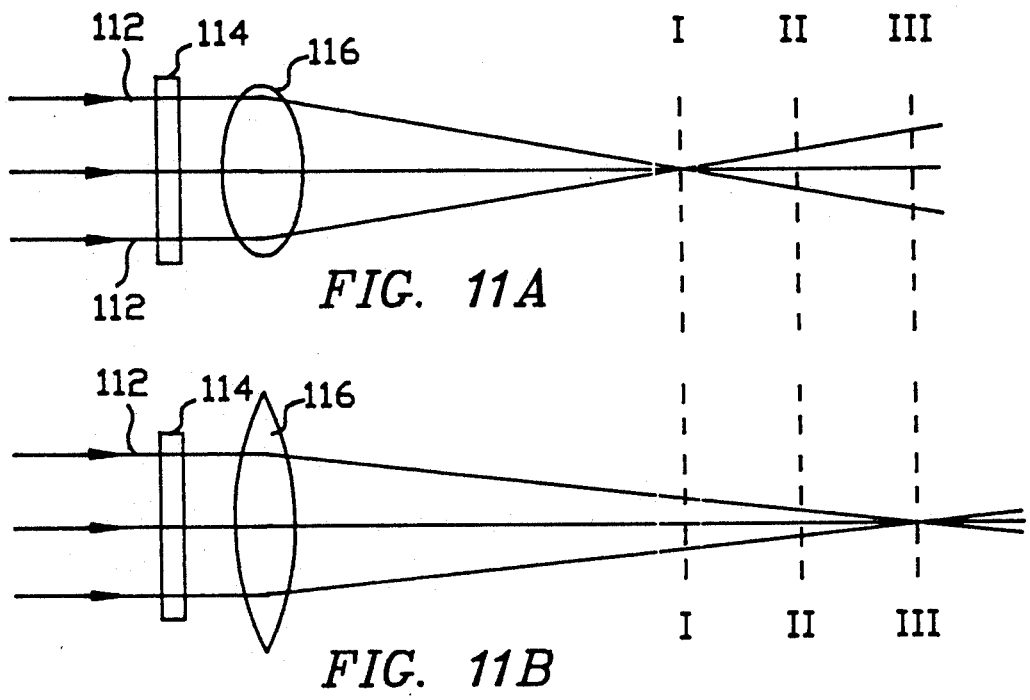
FIG. 11A
FIG. 11B
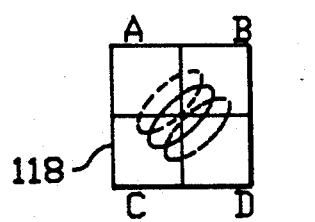
FIG. 12A
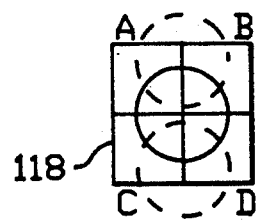
FIG. 12B
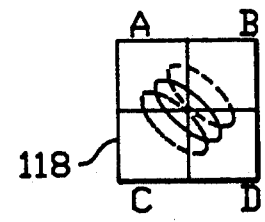
FIG. 12C

OPTICAL BEAM FOCUSING AND TRACKING SYSTEM FOR AN OPTICAL DISK INFORMATION STORAGE DEVICE

BACKGROUND OF THE INVENTION

The present invention related to the storage and retrieval of information from optical media, and more particularly, to a system for reducing the feedthrough between the focus and tracking servo mechanisms of an optical disk drive.

Optical disk drives are in widespread use and include video disk drives used in video applications as well as optical disk drives that serve as peripheral memory storage devices in computer systems. The matter category of drives includes write-once-read-many (WORM) drives, CD-ROM drives and magneto-optic (erasable) drives.

In one form of optical media, information is encoded in concentric or spiral tracks on the surface of a disk by physically altering minute regions of the media to change the reflectivity thereof. Data is written and read from the optical media utilizing a laser beam which is reflected off of the media. It is critical to maintain the laser beam in focus at the appropriate level of the optical media. Optical focusing systems are well known for this purpose and typically include a servo mechanism It is also important to accurately follow the pre-selected data track. Tracking systems for optical disk drives are well known and also typically include a servo mechanism.

Optical focus servo mechanism encounter problems when the light beam crosses between adjacent grooved data tracks. During track crossings, the diffracted order components in the reflected beam vary in a way that can introduce error in the focus signal such that the objective lens is moved completely out of optimal focus. Light amplitude variations caused by the groove structure are particularly troublesome during a radial seek operation. This undesirable phenomenon results in cross-talk between the focus error and track error signals.

One of the most popular focus servo systems utilizes an astigmatic lens and a quad detector. See *Principles of Optical Disc Systems* by G. Bouwhis et al., 1985, pp 79-80. While this system is capable of focusing on smooth, ungrooved surfaces, the presence of data tracks in the form of grooves alters the behavior of the system and leads to undesirable feedthrough or cross-talk.

SUMMARY OF THE INVENTION

Accordingly, it is the primary object of the present invention to provide a system for reducing feedthrough between the focus and tracking servo mechanisms of an optical disk drive.

According to our invention, a mask is used to remove substantially all of the first order diffraction components of a reflected light beam which are generated as the beam reflects off of grooved data tracks in an optical media. The mask may comprise a transparent substrate with an opaque layer having a pair of circular apertures or a bow-tie shaped aperture. The apertures are located outside the regions of interference between the diffracted components and the undiffracted component. The layer may be made of a reflective material for reflecting diffracted components of the reflected beam to a tracking error sensor. The layer may be made of a holographic material for deflecting the diffracted components to a tracking error sensor.

BRIEF DESCRIPTION OF THE DRAWINGS

FIG. 10 is a graph illustrating the performance of an optical disk drive utilizing the bow-tie aperture masks of FIGS. 8A, 8B and 8C.

FIG. 10A is a legend for the individual lines on the graph of FIG. 10.

FIGS. 11A and 11B are top and side views, respectively, illustrating an astigmatic focus error sensor technique in accordance with our invention.

FIGS. 12A, 12B and 12C illustrate the images of a light beam received by a quad detector at three different planes in accordance with the technique of FIGS. 11A and 11B.

DESCRIPTION OF THE PREFERRED EMBODIMENTS

Figure 1:
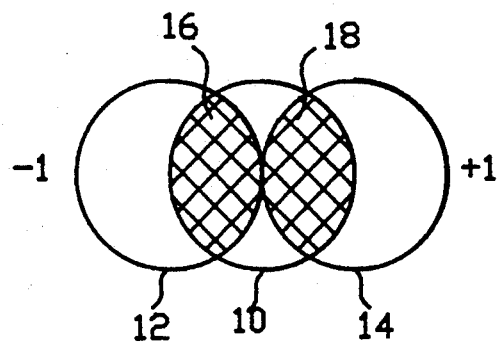
FIG. 1 illustrates the superposition of an undiffracted component of a reflected light beam with a pair of first order diffracted components.

FIG. 1 illustrates the superposition of an undiffracted light beam represented by the spot 10 and two first order diffracted light beams represented by the spots 12 and 14. The beam 10 corresponds to the pupil of the objective lens. The beams 12 and 14 arise from diffraction off of the grooves in the media of an optical recording disk. The beam 12 may be referred to as the negative first order diffraction beam and the beam 14 may be referred to as the positive first order diffraction beam. Both of the beams 12 and 14 are out of phase with the beam 10. The regions of interference 16 and 18 of the first order diffraction beams and the undiffracted beam are cross-hatched in FIG. 1. It is the interference of the diffracted light beams with the undiffracted light beam which gives rise to feedthrough of the tracking error signal (TES) into the focus error signal (FES). This phenomenon is referred to herein as "feedthrough".

Figure 2:
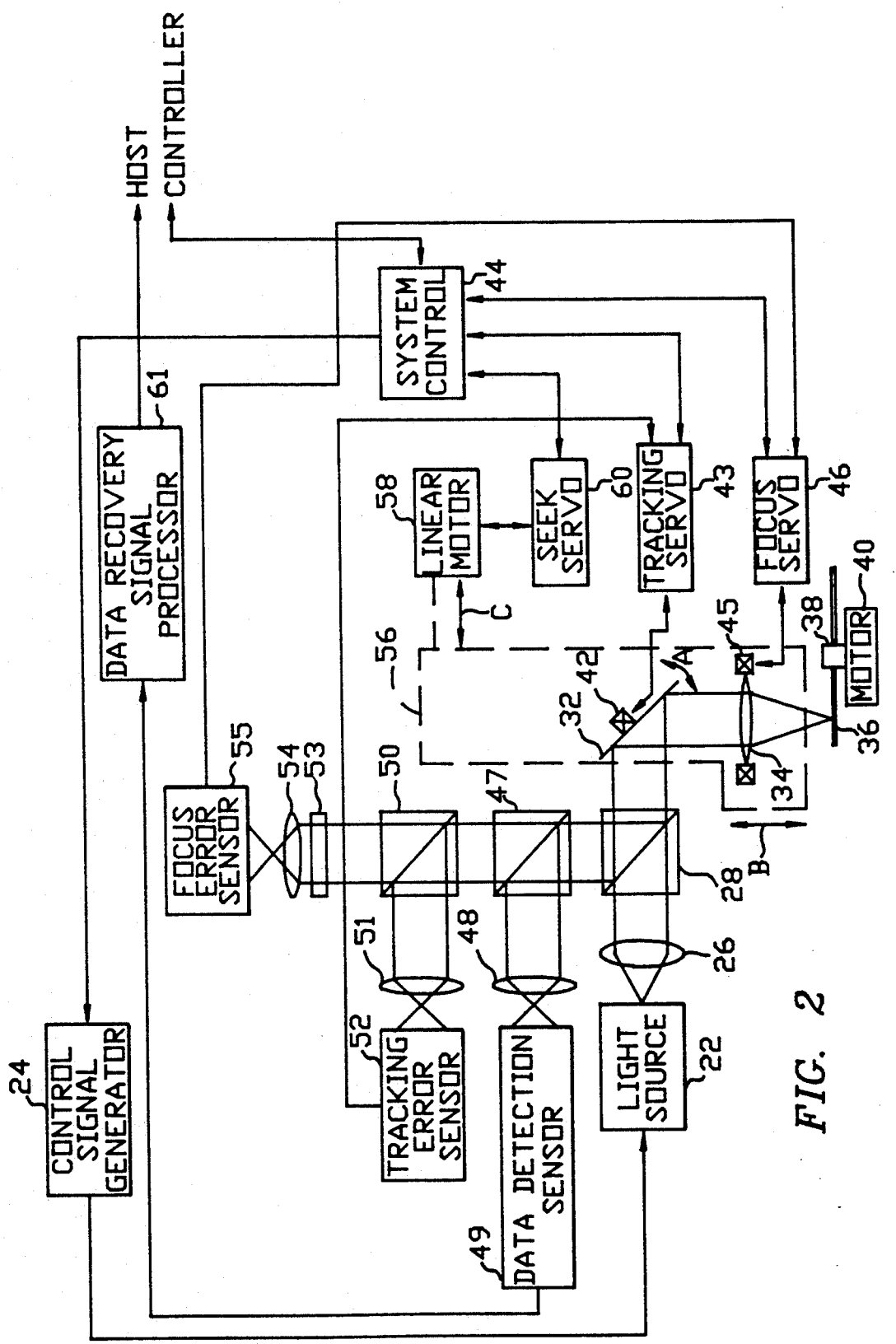
FIG. 2 is a block diagram of an optical disk drive embodying our invention.

FIG. 2 illustrates an optical disk drive system that incorporates our invention. A light source 22 such as a laser is energized by a control signal generator 24. The light beam from the source 22 is transmitted through a lens 26 and a first beam splitting prism 28 to a galvano-mirror 32. The light beam is reflected by the galvano-mirror 32 and focused by an objective lens 34 onto an optical disk 36. The optical disk 36 is supported by a spindle 38 connected to a motor 40 for rotating the disk about a drive axis perpendicular to the plane of the disk. The galvano-mirror 32 is pivotally mounted and moveable through an angle illustrated by the double arrow labeled A in FIG. 2. This movement of the galvano-mirror is accomplished via solenoid 42 to move the light beam in a radial direction on the disk in order to follow an information track encoded thereon. The solenoid 42 is driven by a tracking servo circuit 43 connected to a system control 44.

The objective lens 34 is moved toward and away from the disk 36 as illustrated by the double arrow labeled B in FIG. 2. This movement of the objective lens along an axis perpendicular to a plane of the disk 36 is accomplished by means of a solenoid 45 energized by a focus servo circuit 46 connected to the system control 44.

The optical disk 36 comprises a conventional underlying optical media and an overlying cover plate of either plastic or glass having a thickness of, for example, 1.2 mm. The objective lens 34 is moved toward and away from the optical disk 36 in order to focus the light beam into a spot on the optical media. Information is encoded on the media in binary form in grooved concentric tracks or in a grooved continuous spiral track. In either case, the beam crosses radially between adjacent grooved data tracks during a seek operation.

The system control 44 also commands the control signal generator 24 which drives the light source 22. The light beam reflected from the optical disk 36 is passed through the objective lens 34 back to the galvano-mirror 32. The mirror reflects the light beam through the first beam-splitting prism 28 to a second beam splitting prism 47. A first portion of the reflected light beam is transmitted from the second beam splitting prism 47, through a lens 48 to a data detection sensor 49. A second portion of the light from the beam splitting prism 47 is transmitted to a third beam splitting prism 50. A first portion of the light beam received by the prism 50 is transmitted through a lens 51 to a tracking error sensor 52. A second portion of the light beam received by the prism 50 is transmitted through a mask 53 and a lens 54 to a focus error sensor 55. As explained hereafter in greater detail, mask 53 is designed to permit the transmission of only undiffracted light in the focus channel during track crossings.

The elements enclosed by the phantom lines in FIG. 2 reside in an optical head 56. This head is moved radially across the disk for track selection as illustrated by the double arrow labeled C in FIG. 2. This movement is accomplished utilizing a linear motor 58 driven by a seek servo circuit 60 connected to the system control 44.

The optical disc drive system illustrated in FIG. 2 is thus a three channel system. The reflected light beam is divided by the beam-splitting prisms 47 and 50 between a data channel which includes data detection sensor 49, a tracking error channel which includes tracking error sensor 52 and a focus error channel which includes focus error sensor 55. The data detection sensor 49 may comprise a simple photo-detector for sensing the presence or absence of light. The output signal from the data detection sensor 49 is fed to a data recovery signal processor 61 which is in turn connected to the host controller. The tracking error sensor may be a bi-cell photo-detector that generates a tracking error signal in a conventional manner. This tracking error signal is sent to the tracking servo circuit 43.

The function of the mask 53 (FIG. 2) in the focus error channel is to permit only undiffracted light to be transmitted to focus error sensor 55. Thus, the signal from this sensor represents only the intensity of the undiffracted beam 10 (FIG. 1) and is independent of diffraction phenomena caused by track crossing.

Figure 3:
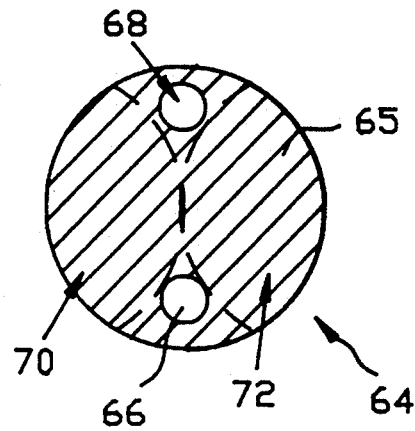
FIG. 3 illustrates a first embodiment of a mask that may be utilized in accordance with our invention to permit only the undiffracted component of the reflected light beam to be received by the detector in the focus channel of the optical disk drive.

In order to obtain an acceptable focus error signal, it is only necessary to collect light from two regions before it passes through lens 54 to focus error sensor 55. FIG. 3 illustrates one embodiment 64 of the mask 53 which may be used to accomplish this goal. It comprises a transparent glass or plastic substrate having a layer 65 of opaque or reflective material applied thereto except for two small circular apertures 66 and 68. These apertures are located outside the regions of interference 70 and 72 bounded by phantom lines in FIG. 3. The opaque layer may be formed with black paint. As an alternative, a reflective layer may be formed of a film such as chromium. If the mask 64 has an opaque layer 65 the focus error can be detected by either a knife edge technique or a spot-size measurement technique.

Figure 4:
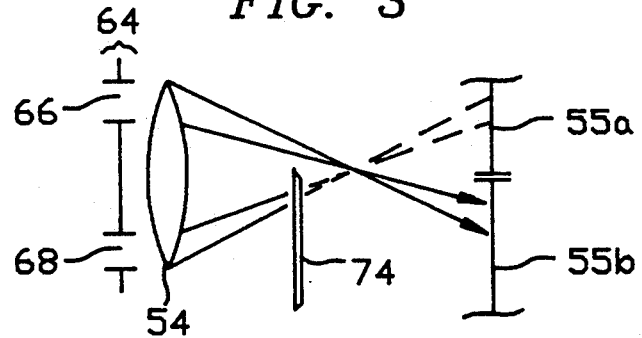
FIG. 4 illustrates a knife-edge technique for generating a focus error signal in accordance with our invention.

According to the knife-edge technique of FIG. 4, light passing through the apertures 66 and 68 of the mask 64 is partially obstructed by a knife-edge 74 so that the output of two separate photo-diodes 55a and 55b provides a focus error signal. The focus error signal is equal to the difference in the output of photo-diodes 55a and 55b divided by the sum of their outputs.

Figure 5A:
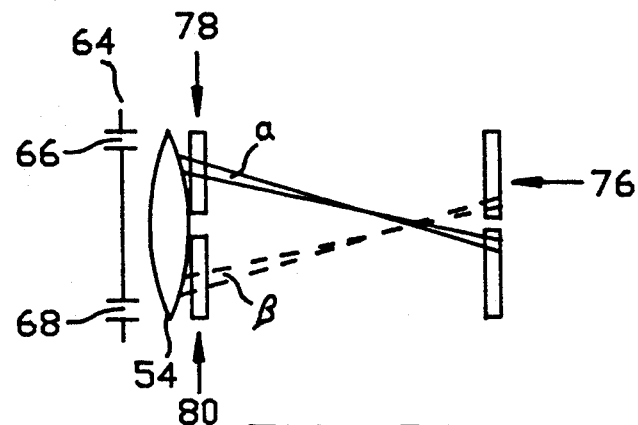
FIGS. 5A, 5B and 5C illustrate a dual knife-edge technique for generating a focus error signal in accordance with our invention.
Figure 5B:
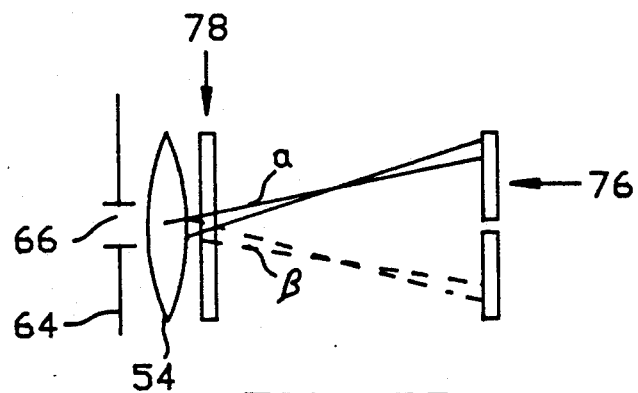
Figure 5C:
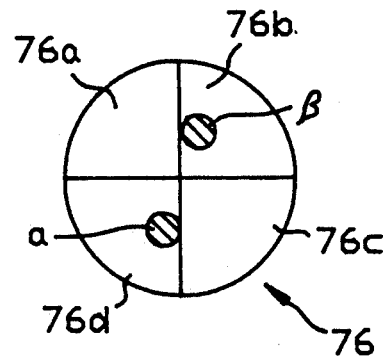

One drawback of the knife-edge detection scheme is that it is difficult to align. The knife-edge technique allows the system to distinguish between light coming from the upper and lower apertures 66 and 68 in the mask of FIG. 3. On one side of the focus, the knife-edge blocks light from the upper aperture, and on the other side of the focus it blocks light from the lower aperture. If the light from each aperture is directed to its own bi-cell detector, the alignment is greatly simplified. FIG. 5A and FIG. 5B illustrate a dual knife-edge focus error sensor technique. Referring to the side view of FIG. 5A, beams alpha and beta from the apertures 66 and 68 are transmitted to a quad-cell photodiode 76 FIG. 5C is a front view of the quad-cell photodiode 76 illustrating the four separate quadrants 76a, 76b, 76c and 76d thereof. Referring again to FIG. 5A, beam deflectors 78 and 80 introduce a lateral offset between the two beams alpha and beta. This offset is visible in the top view of FIG. 5B. Referring again to FIG. 5C, quadrants 76a and 76b act as a bi-cell detector for the beta beam. Quadrants 76c and 76d serve the same function for the alpha beam. The technique of FIGS. 5A–C permits simple adjustment of the focus error sensor.

Figure 6:
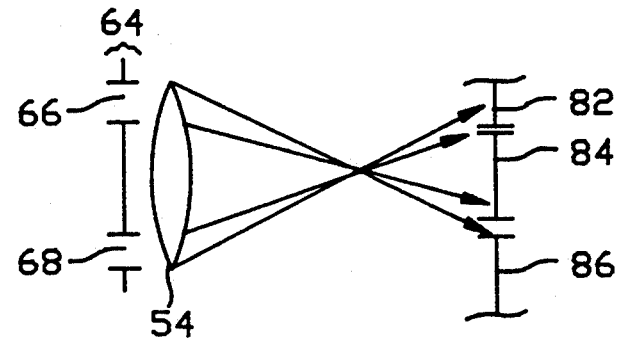
FIG. 6 illustrates a spot-size measurement technique for generating a focus error signal in accordance with our invention.

According to the spot-size measurement technique of FIG. 6, light passing through the apertures 66 and 68 of the mask 64 passes through the lens 54 and is detected by a plurality of photo-diodes 82, 84 and 86. The amplitudes of the signals from these photo-diodes are used to generate a focus error signal. The focus error signal is equal to the difference between the output signal of the photo-diode 84 and the sum of the output of the photo-diodes 82 and 86, divided by the sum of the output signals from the photo-diodes 82, 84 and 86.

Figure 7A:
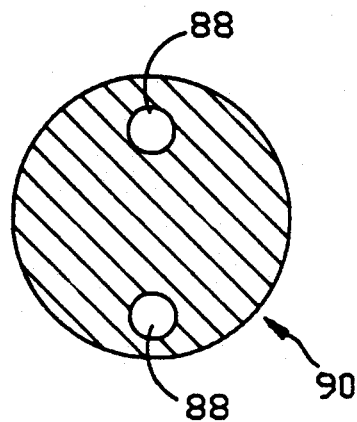
FIGS. 7A, 7B and 7C illustrate further embodiments of circular aperture masks that may be utilized in accordance with our invention.
Figure 7B:
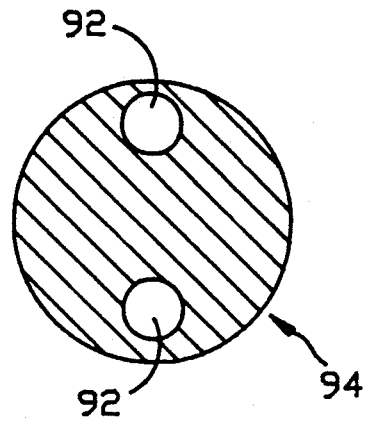
Figure 7C:
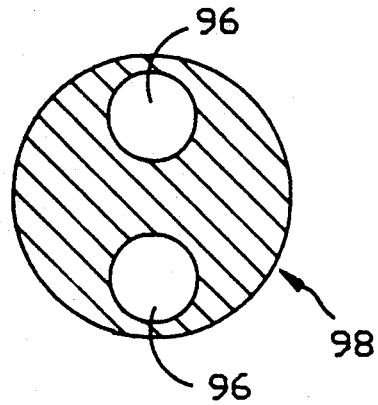
Figures 9, 9A:
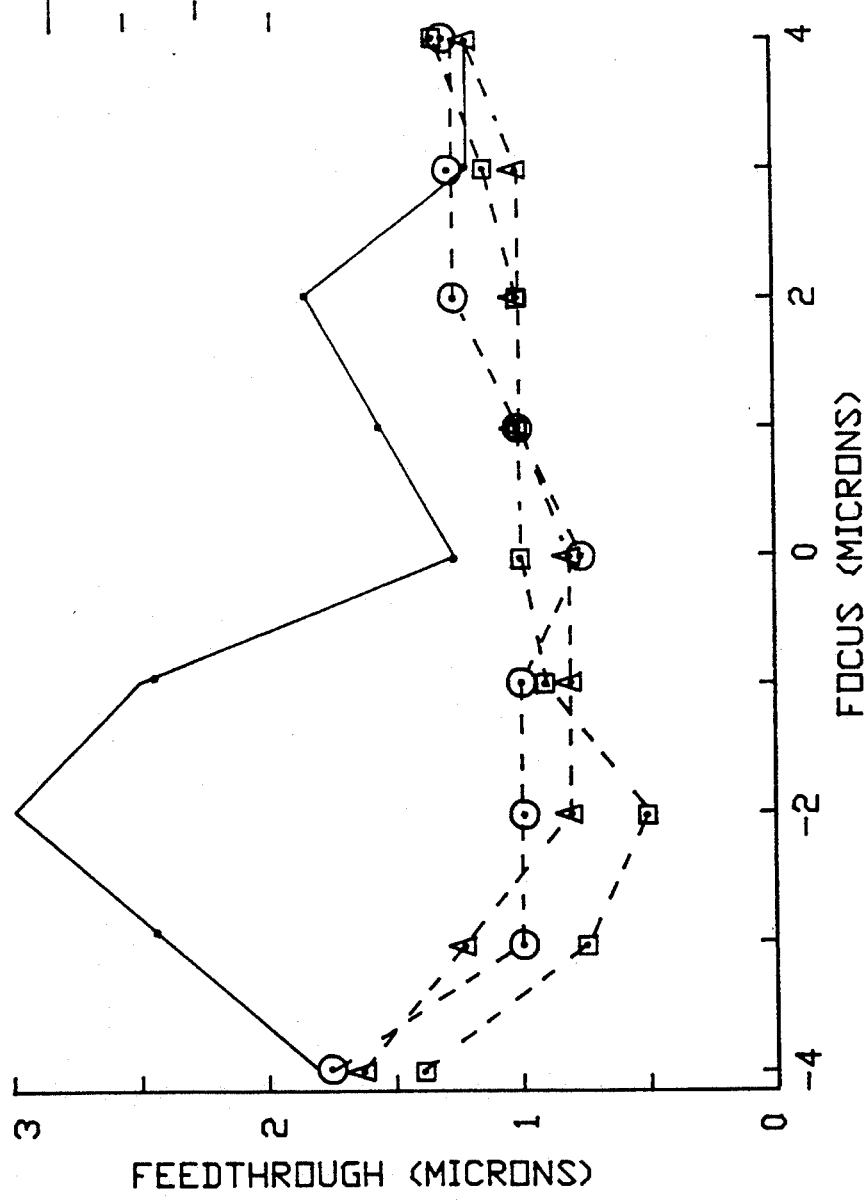
FIG. 9 is a graph depicting the performance of an optical disk drive utilizing the circular aperture masks of FIGS. 7A, 7B and 7C.
FIG. 9A is a legend for the individual lines on the graph of FIG. 9.

FIGS. 7A, 7B and 7C show alternative embodiments of the mask. Each may be formed with a glass or transparent plastic disk having a diameter of approximately 5.5 mm. Each of the masks of FIGS. 7A, 7B and 7C has a layer of opaque material applied thereto except for a pair of circular apertures adjacent the peripheries thereof. The diameter of the small apertures 88 of the mask 90 of FIG. 7A measures approximately 0.75 mm. The diameter of the intermediate apertures 92 of the mask 94 of FIG. 7B measures approximately 1.25 mm. The diameter of the large apertures 96 of the mask 98 of FIG. 7C measures approximately 1.75 mm. FIG. 9 illustrates the amount of feedthrough in microns versus the focus displacement in microns for each of the masks of FIG. 7A, 7B and 7C when independently utilized in an optical disk drive in comparison to the performance of the same optical disk drive without any mask. FIG. 9A is a legend for the individual lines on the graph of FIG. 9. Each of the circular aperture masks yields a significant reduction in the amount of feedthrough versus the performance of the optical disk drive without any mask.

Figure 8A:
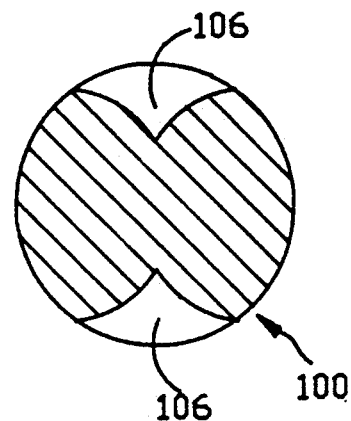
FIGS. 8A, 8B and 8C illustrate embodiments of bow-tie shaped aperture masks that may be utilized in accordance with our invention.
Figure 8B:
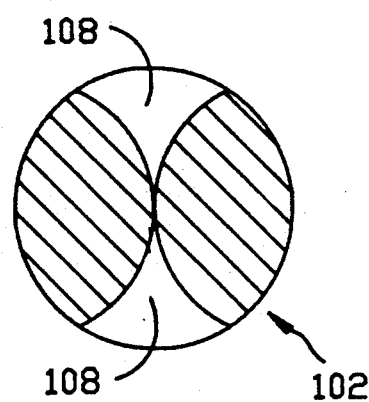
Figure 8C:
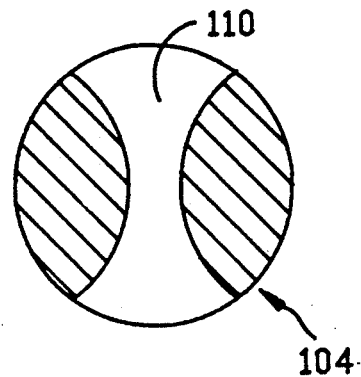

FIGS. 8A, 8B and 8C illustrate alternate embodiments of masks 100, 102 and 104 having small, intermediate and large bow-tie shaped apertures 106, 108 and 110, respectively, formed in opaque layers applied to underlying transparent substrates. The graph of FIG. 10 illustrates the reduction in feedthrough achieved when each of the masks of FIGS. 8A, 8B and 8C having the small, intermediate and large bow-tied shaped apertures is independently used in an optical disk drive compared with the performance of the optical disk drive with no mask. FIG. 10A is a legend for the individual lines of the graph of FIG. 10. The mask of FIG. 8B having the intermediate sized bow-tie shaped aperture produces the greatest reduction in feedthrough. This is because the mask of FIG. 8B completely removes the diffracted components while transmitting most of the undiffracted light.

Our invention may be utilized in an optical disk drive system having --n astigmatic focus-error sensor such as that illustrated in FIG. 11A and 11B. The light beam 112 returning from the objective lens passes through a pair of circular or bowtie shaped apertures (not visible) in a mask 114 before passing through an astigmatic lens 116. FIG. 11A is a top view and FIG. 11B is a side view. The lens 116 causes the beam to be focused at one plane (labeled I) in the top view of FIG. 11A and at a different plane (labeled III) in a side view of FIG. 11B. Thus, two line images are formed at planes I and III. At an intermediate plane (labeled II) a circular image is formed. A quad detector 118 (FIGS. 12A 12B and 12C) is used for detection which is rotated forty-five degrees about the optical axis. Thus, FIGS. 12A, 12B and 12C show the images of the beam 112 passing through the apertures of the mask 114 at the planes I, II and III, respectively. The undiffracted components of the image are shown in solid lines in FIGS. 12A, 12B and 12C whereas the diffracted components are shown in phantom lines in FIGS. 12A, 12B and 12C. The focus error signal is obtained by adding the signal from quadrants A and D and subtracting therefrom the sum of a signal from quadrants B and C. With the mask 114, the undesired diffraction order images illustrated in phantom lines in FIGS. 12A, 12B and 12C are eliminated and only the zero order light shown by the solid line images in these figures is allowed to pass to the quad detector 118.

Figure 13:
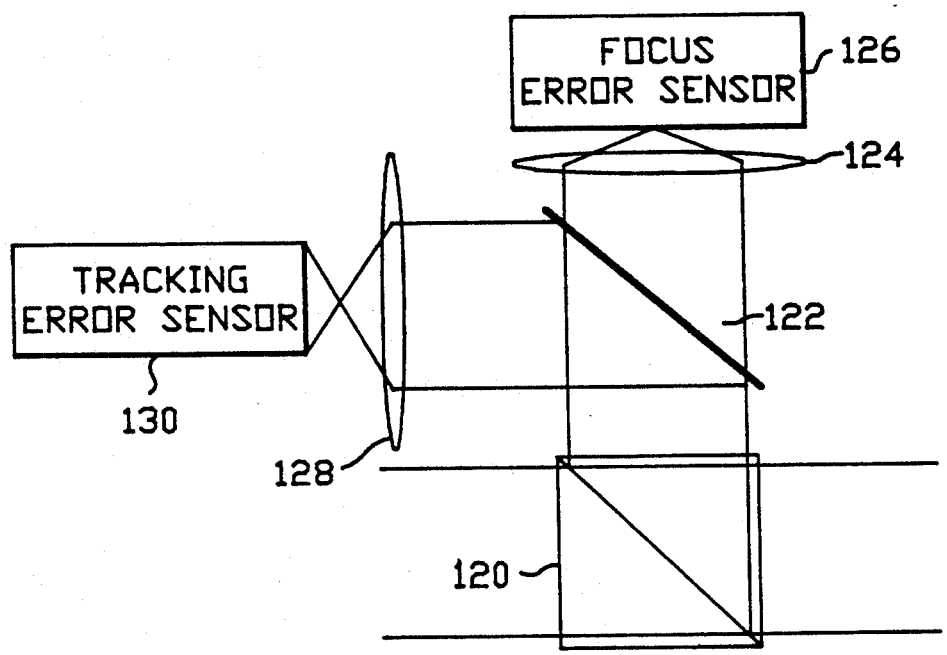
FIG. 13 illustrates an alternate embodiment of our invention utilizing a mask with a reflective layer.

If the mask utilizes a reflective layer having apertures formed therein instead of an opaque layer, the beam splitter 50 in FIG. 2 may be eliminated. Referring to FIG. 13, a beam splitter 120 sends light reflected back through the objective lens to an angularly disposed mask 122. Reflected light passes through apertures in this mask and through a lens 124 to a focus error sensor 126. The diffracted components of the reflected light beam are reflected off of the reflective layer on mask 122 through a lens 128 to a tracking error sensor 130.

Figure 14:
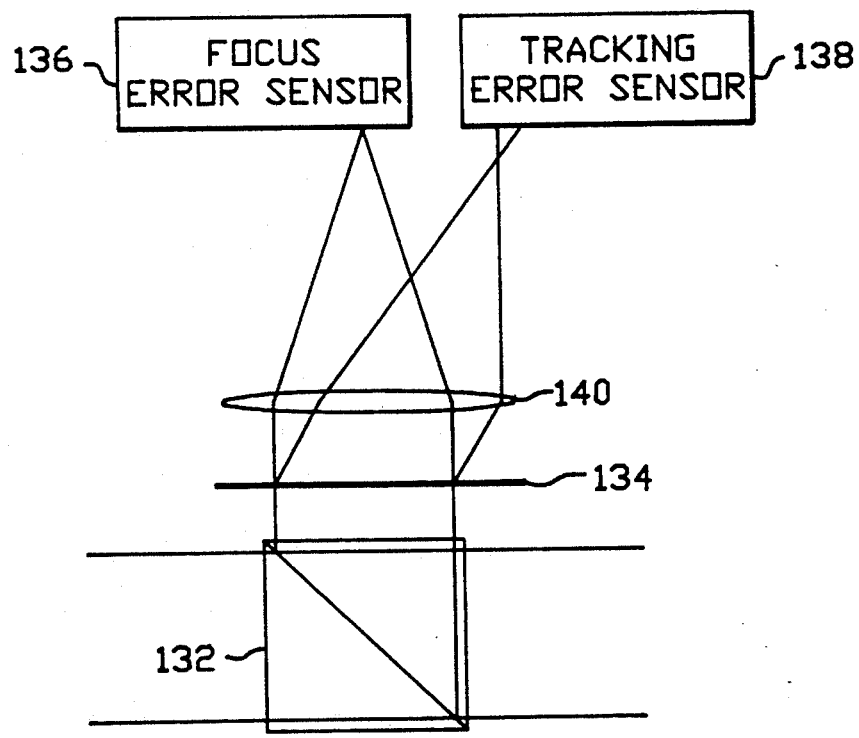
FIG. 14 illustrates an alternate embodiment of our invention utilizing a mask with a layer of holographic material.

FIG. 14 illustrates another technique for eliminating one of the beam splitters in the FIG. 2 embodiment. Light reflected from the optical disk back through a beam splitter 132 is transmitted through a mask 134. This mask is comprised of a transparent substrate having a layer of exposed holographic material such as dichromated gelatin. This layer has apertures formed therein in accordance with FIGS. 7A, 7B, 7C or FIGS. 8A, 8B or 8C. The hologram consists of a one-dimension diffraction grating preferrably running parallel to the tracking groove in the optical disk. The hologram redirects the light associated with the diffracted components. The light which falls on the apertures on the mask is transmitted unperturbed to a focus error sensor 136. Light passing through the holographic material is deflected to a tracking error sensor 138. Both the redirected light and the unperturbed light pass through a lens 140. The focus error sensor 136 may consist of any detection geometry previously described and the tracking error sensor 138 may consist of a bi-cell. While holographic beam splitters have previously been proposed in optical disk drive systems, they have not been oriented to separate the diffracted and undiffracted components of the reflected beam.

It can thus be seen that our invention utilizes non-complex, low-cost components which can be easily aligned to produce significant reduction in feedthrough between the focus and tracking servo mechanisms of an optical disk drive. Whereas the prior art contains numerous examples of focus error sensors, most share a common problem in potential for excessive feedthrough as well as requiring critical alignment procedures and demanding wavefront quality.

While we have described various embodiments of our invention, it should be understood by those skilled in the art that our invention can be modified in both arrangement and detail. For example, our invention could be utilized in a magneto-optic disk drive. Our invention could also be used in two-channel systems. Accordingly, the protection afforded our invention should be limited only in accordance with the scope of the following claims:

We claim:
1. An optical disk drive, comprising:
   means for supporting and rotating an optical disk including an optical medium with a plurality of grooved data tracks having information encoded therein;
   means for generating a beam of light;
   means for focusing the beam of light into a spot on the optical medium including a focus servo circuit;
   means for directing the spot to follow a pre-selected grooved data track including a tracking servo circuit;
   a first optical sensor connected to the focus servo circuit;

a second optical sensor connected to the tracking servo circuit;

means for directing a first portion of the beam after it has been reflected by the optical medium to the first optical sensor and for directing a second portion of the reflected beam to the second optical sensor, including mask means for permitting only undiffracted components of the reflected beam to be received by the first optical sensor; and data recovery signal processing means for generating output signals representative of the encoded information based on the reflected beam.

2. An optical disk drive according to claim 1 wherein the mask means include a transparent substrate having a layer of material covering a surface thereof, said layer of material being selected from the group consisting of opaque material, reflective material and holographic material.

3. An optical disk drive according to claim 2 wherein the layer of material has a pair of apertures formed therein which ar sized and positioned to permit only undiffracted components of the reflected light beam to pass therethrough.

4. An optical disk drive according to claim 3 wherein the apertures have a circular configuration.

5. An optical disk drive according to claim 3 wherein the apertures have a bow-tie shaped configuration.

6. An optical disk drive according to claim 1 wherein the layer of material has a pair of apertures formed therein which are sized and positioned to permit only undiffracted components of the reflected light beam to pass therethrough.

7. An optical disk drive according to claim 6 wherein the apertures have a bow-tie shaped configuration.

8. In an optical disk drive including a light source and an objective lens for focusing a beam of light from the source into a spot on a rotating optical medium having information encoded thereon in a plurality of grooved data tracks, a first servo mechanism for focusing the light beam on the optical medium, a second servo mechanism for directing the light beam to follow a preselected track, an optical detector connected to the first servo mechanism for receiving the reflected light beam ,said reflected light beam having a zeroth order diffraction component (10) and two first order diffraction components (12, 14), and a data recovery signal processor for generating output signals representative of the encoded information in response to the reflected light beam, the improvement comprising:

mask means for removing substantially all of the first order diffraction components of the reflected light beams, said mask means including a transparent substrate having a layer of material covering a surface thereof, said layer of material being selected from the group consisting of opaque material, reflective material and holographic material; and a pair of apertures formed in said layer of material, said pair of apertures being sized and positioned to permit only undiffracted components of the reflected light beam to pass therethrough.

9. An optical disk drive according to claim 8 wherein the apertures have a circular configuration.

10. An optical disk drive according to claim 8 wherein the apertures have a bow-tie shaped configuration.

11. A method of reducing feedthrough between a focus servo and a tracking servo of an optical disk drive as the light beam crosses between adjacent grooved data tracks, comprising the steps of:

providing a mask in front of a focus detector of the drive in order to permit only an undiffracted component of a reflected light beam to be received by the focus detector; and processing an output signal of the focus detector to provide an error signal to the focus servo.

12. A method according to claim 11 wherein the mask has a transparent substrate and an opaque covering thereon corresponding in location to a pair of interference regions in the reflected beam.

13. A method according to claim 11 wherein the mask has a transparent substrate and a reflective covering thereon corresponding in location to a pair of interference regions in the reflective beam.

14. A method according to claim 11 wherein the mask has a transparent substrate and a holographic covering thereon corresponding in location to a pair of interference regions in the reflected beam.

* * * * *